US 9,140,816 B2

(12) United States Patent
Market et al.

(10) Patent No.: US 9,140,816 B2
(45) Date of Patent: Sep. 22, 2015

(54) APPARATUS AND METHOD FOR DETERMINING FORMATION ANISOTROPY

(75) Inventors: Jennifer Market, Rosehill, TX (US); Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 614 days.

(21) Appl. No.: 13/497,035

(22) PCT Filed: Aug. 17, 2010

(86) PCT No.: PCT/US2010/045770
§ 371 (c)(1),
(2), (4) Date: Apr. 8, 2012

(87) PCT Pub. No.: WO2011/022408
PCT Pub. Date: Feb. 24, 2011

(65) Prior Publication Data
US 2012/0227500 A1    Sep. 13, 2012

Related U.S. Application Data

(60) Provisional application No. 61/234,980, filed on Aug. 18, 2009.

(51) Int. Cl.
*G01V 1/50* (2006.01)
*G01N 29/04* (2006.01)

(52) U.S. Cl.
CPC ....................... *G01V 1/50* (2013.01)

(58) Field of Classification Search
CPC ........... G01V 1/50; G01V 1/40; G01V 1/143; G01N 29/04
USPC ........ 73/570, 152.02, 152.03; 367/30, 73, 75; 181/102, 103
See application file for complete search history.

(56) References Cited

U.S. PATENT DOCUMENTS

| 4,380,806 | A | * | 4/1983 | Waters et al. ................... 367/27 |
| 4,760,563 | A | * | 7/1988 | Beylkin .......................... 367/73 |
| 4,804,051 | A | | 2/1989 | Ho |
| 4,832,148 | A | | 5/1989 | Becker et al. |
| 4,984,652 | A | * | 1/1991 | Batzle et al. .................. 181/104 |
| 5,712,829 | A | | 1/1998 | Tang et al. |
| 6,098,021 | A | | 8/2000 | Tang et al. |
| 6,137,747 | A | | 10/2000 | Shah et al. |
| 6,456,064 | B1 | * | 9/2002 | Dore et al. ................ 324/207.13 |
| 6,772,067 | B2 | | 8/2004 | Blanch et al. |
| 6,791,899 | B2 | * | 9/2004 | Blanch et al. ................... 367/38 |
| 7,273,108 | B2 | * | 9/2007 | Misselbrook ................. 166/381 |
| 7,299,132 | B2 | | 11/2007 | Sayers et al. |
| 2003/0206488 | A1 | | 11/2003 | Blanch et al. |

\* cited by examiner

*Primary Examiner* — J M Saint Surin
(74) *Attorney, Agent, or Firm* — McGuireWoods, LLP

(57) ABSTRACT

A method of generating an axial shear wave in a formation surrounding a wellbore comprising urging a clamp pad into contact with a wall of the wellbore, and applying an axial force to the clamp pad to impart a shear force into the wall of the wellbore to generate a shear wave in the formation.

9 Claims, 7 Drawing Sheets

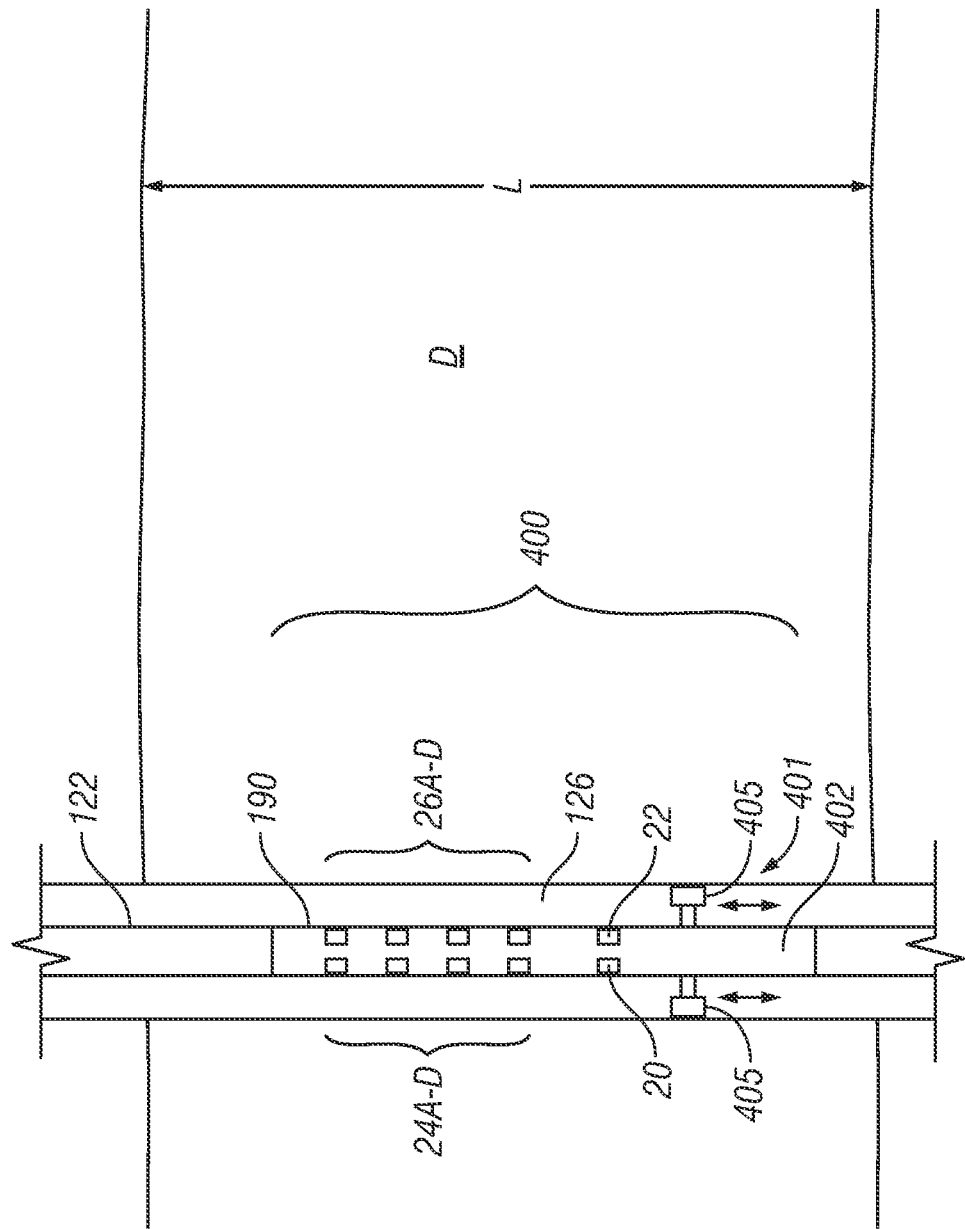

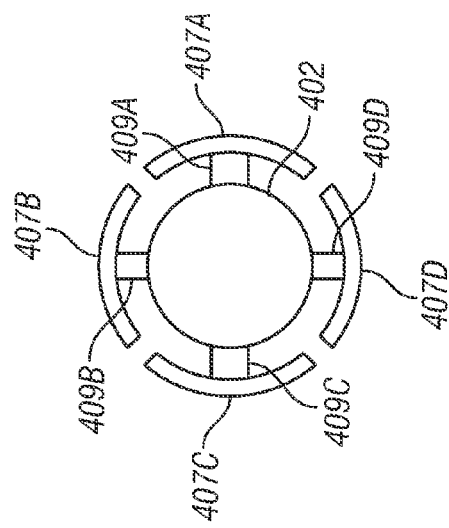
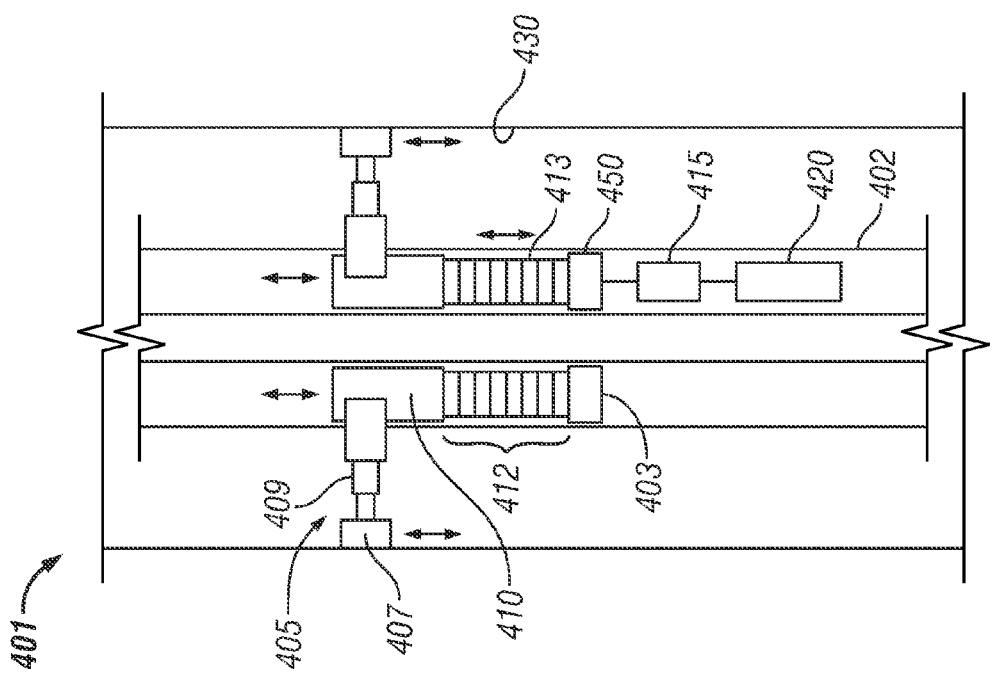

APPARATUS AND METHOD FOR DETERMINING FORMATION ANISOTROPY

BACKGROUND

The present disclosure relates generally to the field of acoustic logging.

Certain earth formations exhibit a property called "anisotropy", wherein the velocity of acoustic waves polarized in one direction may be somewhat different than the velocity of acoustic waves polarized in a different direction within the same earth formation. Anisotropy may arise from intrinsic structural properties, such as grain alignment, crystallization, aligned fractures, or from unequal stresses within the formation. Anisotropy is particularly of interest in the measurement of the velocity of shear/flexural waves propagating in the earth formations. Shear or S waves are often called transverse waves because the particle motion is in a direction "transverse", or perpendicular, to the direction that the wave is traveling.

Acoustic waves travel fastest when the direction of particle motion polarization direction is aligned with the material's stiffest direction. If the formation is anisotropic, meaning that there is one direction that is stiffer than another, then the component of particle motion aligned in the stiff direction travels faster than the wave component aligned in the other, more compliant, direction in the same plane. In the case of 2-dimensional anisotropy, a shear wave induced into an anisotropic formation splits into two components, one polarized along the formation's stiff (or fast) direction, and the other polarized along the formation's compliant (or slow) direction. Generally, the orientation of these two polarizations is substantially orthogonal (components which are at a 90° angle relative to each other). The fast wave is polarized along the direction parallel to the fracture strike and a slow wave in the direction perpendicular to it.

A significant number of hydrocarbon reservoirs comprise fractured rocks wherein the fracture porosity makes up a large portion of the fluid-filled space. In addition, the fractures also contribute significantly to the permeability of the reservoir. Identification of the direction and extent of fracturing is important in reservoir development for at least two reasons.

One reason for identification of fracture direction is that such a knowledge makes it possible to drill deviated or horizontal boreholes with an axis that is preferably normal to the plane of the fractures. In a rock that otherwise has low permeability and porosity, a well drilled in the preferred direction will intersect a large number of fractures and thus have a higher flow rate than a well that is drilled parallel to the fractures. Knowledge of the extent of fracturing also helps in making estimates of the potential recovery rates in a reservoir and in enhancing the production from the reservoir.

BRIEF DESCRIPTION OF THE DRAWINGS

A better understanding of the present invention can be obtained when the following detailed description of example embodiments are considered in conjunction with the following drawings, in which:

FIG. 5 shows an example of an acoustic tool having an axial shear wave generator; and FIG. 6 shows an example of an axial shear wave generator in a wellbore.

DETAILED DESCRIPTION

Figure 1A:
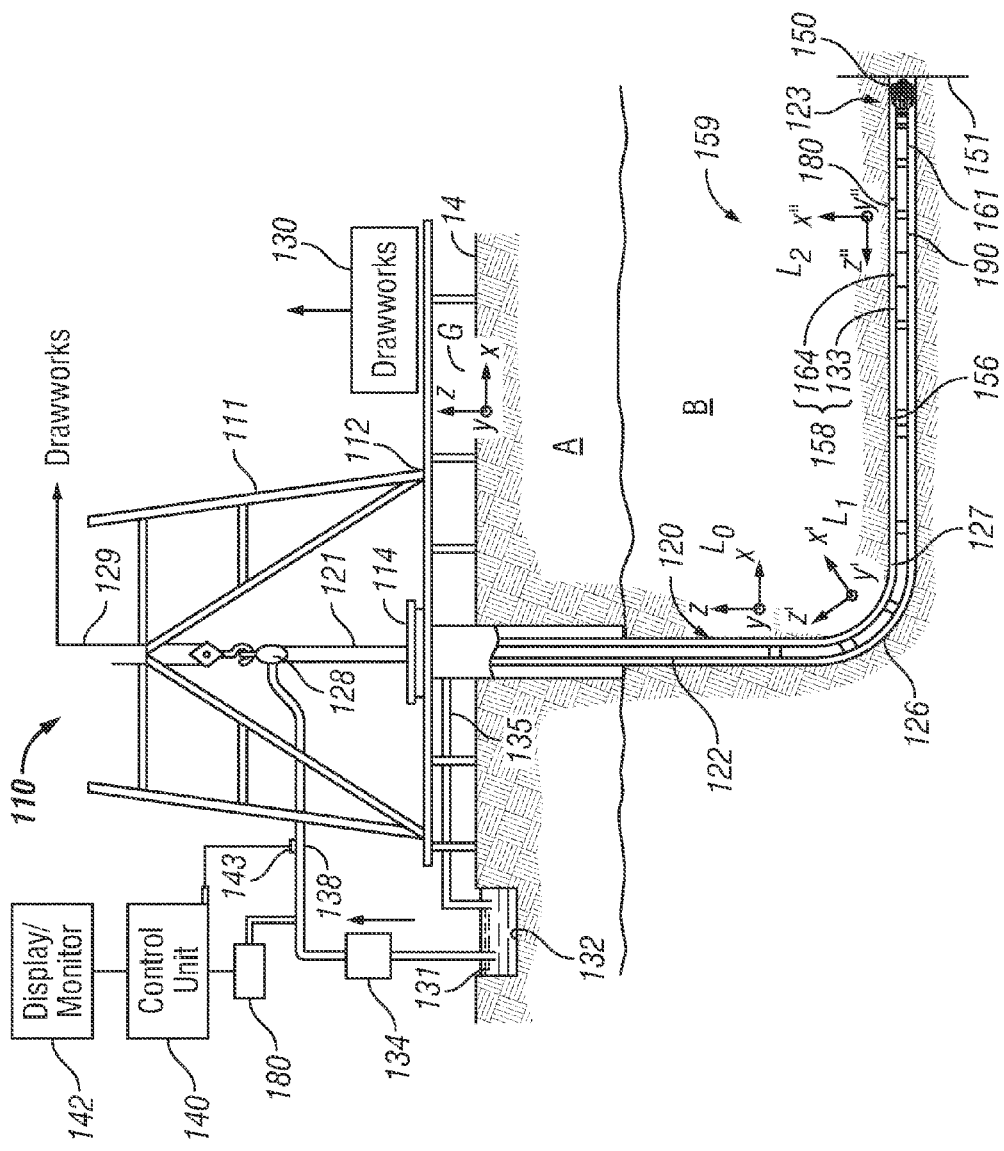
FIG. 1A shows an example of a drilling system traversing a downhole formation.

FIG. 1A shows a schematic diagram of a drilling system 110 having a downhole assembly according to one embodiment of the present invention. As shown, the system 110 includes a conventional derrick 111 erected on a derrick floor 112 which supports a rotary table 114 that is rotated by a prime mover (not shown) at a desired rotational speed. A drill string 120 comprising a drill pipe section 122 extends downward from rotary table 114 into a directional borehole, also called a wellbore, 126, through subsurface formations A and B. Borehole 126 may travel in a two-dimensional and/or three-dimensional path. A drill bit 150 is attached to the downhole end of drill string 120 and disintegrates the geological formation 123 when drill bit 150 is rotated. The drill string 120 is coupled to a drawworks 130 via a kelly joint 121, swivel 128 and line 129 through a system of pulleys (not shown). During the drilling operations, drawworks 130 may be operated to raise and lower drill string 120 to control the weight on bit 150 and the rate of penetration of drill string 120 into borehole 126. The operation of drawworks 130 is well known in the art and is thus not described in detail herein.

During drilling operations a suitable drilling fluid (also called "mud") 131 from a mud pit 132 is circulated under pressure through drill string 120 by a mud pump 134. Drilling fluid 131 passes from mud pump 134 into drill string 120 via fluid line 138 and kelly joint 121. Drilling fluid 131 is discharged at the borehole bottom 151 through an opening in drill bit 150. Drilling fluid 131 circulates uphole through the annular space 127 between drill string 120 and borehole 126 and is discharged into mud pit 132 via a return line 135. A variety of sensors (not shown) may be appropriately deployed on the surface according to known methods in the art to provide information about various drilling-related parameters, such as fluid flow rate, weight on bit, hook load, etc.

In one example, a surface control unit 140 may receive signals from downhole sensors (discussed below) via a telemetry system and processes such signals according to programmed instructions provided to surface control unit 140. Surface control unit 140 may display desired drilling parameters and other information on a display/monitor 142 which may be used by an operator to control the drilling operations. Surface control unit 140 may contain a computer, memory for storing data and program instructions, a data recorder, and other peripherals. Surface control unit 140 may also include drilling models and may process data according to programmed instructions, and respond to user commands entered through a suitable input device, such as a keyboard (not shown).

In one example embodiment of the present invention, bottom hole assembly (BHA) 159 is attached to drill string 120, and may comprise a measurement while drilling (MWD) assembly 158, an acoustic tool 190, a drilling motor 180, a steering apparatus 161, and drill bit 150. MWD assembly 158 may comprise a sensor section 164 and a telemetry transmitter 133. Sensor section 164 may comprise various sensors to provide information about the formation 123 and downhole drilling parameters.

MWD sensors in sensor section 164 may comprise a device to measure the formation resistivity, a gamma ray device for measuring the formation gamma ray intensity, directional sensors, for example inclinometers and magnetometers, to determine the inclination, azimuth, and high side of at least a portion of BHA 159, and pressure sensors for measuring drilling fluid pressure downhole. The above-noted devices may transmit data to a telemetry transmitter 133, which in turn transmits the data uphole to the surface control unit 140. In one embodiment a mud pulse telemetry technique may be used to generate encoded pressure pulses, also called pressure signals, that communicate data from downhole sensors and devices to the surface during drilling and/or logging operations. A transducer 143 may be placed in the mud supply line 138 to detect the encoded pressure signals responsive to the data transmitted by the downhole transmitter 133. Transducer 143 generates electrical signals in response to the mud pressure variations and transmits such signals to surface control unit 140. Alternatively, other telemetry techniques such as electromagnetic and/or acoustic techniques or any other suitable telemetry technique known in the art may be utilized for the purposes of this invention. In one embodiment, drill pipe sections 122 may comprise hard-wired drill pipe which may be used to communicate between the surface and downhole devices. Hard wired drill pipe may comprise segmented wired drill pipe sections with mating communication and/or power couplers in the tool joint area. Such hard-wired drill pipe sections are commercially available and will not be described here in more detail. In one example, combinations of the techniques described may be used. In one embodiment, a surface transmitter/receiver 180 communicates with downhole tools using any of the transmission techniques described, for example a mud pulse telemetry technique. This may enable two-way communication between surface control unit 140 and the downhole tools described below.

Figure 2:
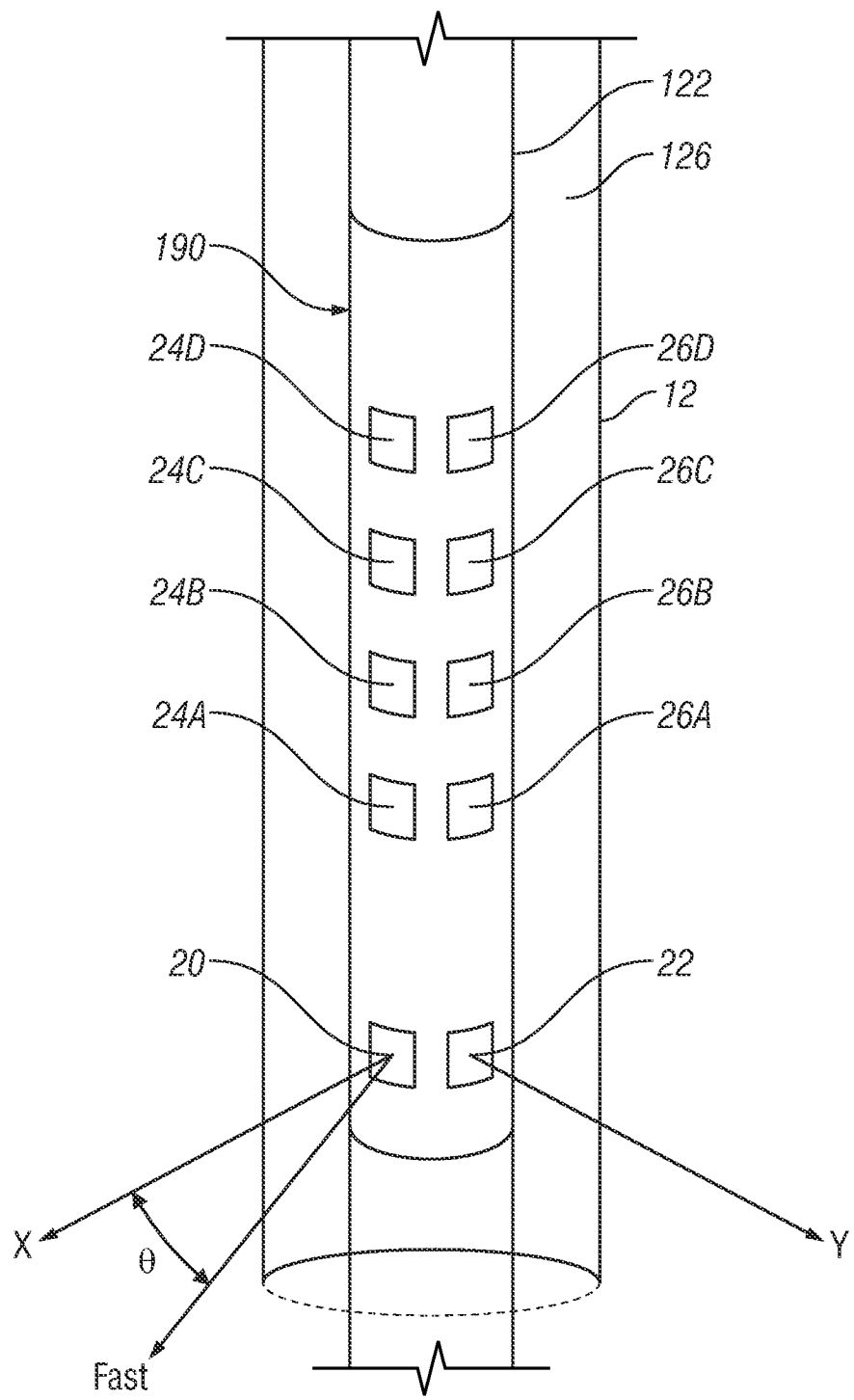
FIG. 2 shows an example of an acoustic tool.

FIG. 2 shows an example of acoustic tool 190. FIG. 2 shows the tool 190 disposed in BHA 159 within a fluid filled borehole 126. Alternatively, the tool 190 may be suspended within the borehole by a multi-conductor armored cable known in the art.

The tool 190 comprises a set of dipole transmitters: a first dipole transmitter 20, and a second dipole transmitter 22. In the perspective view of FIG. 2, only one face of each of the dipole transmitters 20, 22 may be seen. However, one of ordinary skill in the art understands that a complimentary face of each dipole transmitter 20 and 22 is present on a back surface of the tool 10. The dipole transmitters may be individual transmitters fired in such a way as to act in a dipole fashion. The transmitter 20 induces its acoustic energy along an axis, which for convenience of discussion is labeled X in the FIG. 2. Transmitter 22 induces energy along its axis labeled Y in FIG. 2, where the X and Y axes (and therefore transmitters 20, 22) may be, in one example, orthogonal. The orthogonal relationship of the transmitters 20, 22 need not necessarily be the case, but a deviation from an orthogonal relationship complicates the decomposition of the waveforms. The mathematics of such a non-orthogonal decomposition are within the skill of one skilled in the art without undue experimentation.

Tool 190 may also comprise a plurality of receiver pairs 24 and 26 at elevations spaced apart from the transmitters 20, 22. In one embodiment tool 190 comprises four pairs of dipole receivers 24 A-D and 26 A-D. However, any number of receiver pairs may be used without departing from the spirit and scope of the invention. In the example shown in FIG. 2, the receivers are labeled 24A-D and 26A-D. In one example, each set of dipole receivers at a particular elevation has one receiver whose axis is coplanar with the axis of transmitter 20 (in the X direction) and one receiver whose axis is coplanar with the axis of transmitter 22 (in the Y direction). For example, one set of dipole receivers could be receivers 24A and 26A. Thus, the dipole receivers whose axes are coplanar with the axis of transmitter 20 are the transmitters 24A-D Likewise the dipole receivers whose axes are coplanar with the axis of transmitter 22 are receivers 26 A-D. It is not necessary that the axes of the receivers be coplanar with the axes of one of the transmitters. However, azimuthally rotating any of the receiver pairs complicates the trigonometric relationships and, therefore, the data processing. The mathematics of such a non-orthogonal decomposition are within the skill of one skilled in the art without undue experimentation.

Anisotropic earth formations tend to break an induced shear wave into two components: one of those components traveling along the faster polarization direction, and the second component traveling along the slower polarization direction, where those two directions are substantially orthogonal. The relationship of the fast and slow polarizations within the formation, however, rarely lines up with the orthogonal relationship of the dipole transmitters 20, 22. For convenience of the following discussion and mathematical formulas, a strike angle $\Theta$ is defined to be the angle between the X direction orientation (the axis of dipole transmitter 20) and the faster of the two shear wave polarizations (see FIG. 2). Further, it must be understood that the shear wave of interest does not propagate in the X or Y direction, but instead propagates in the Z direction where the Z direction is parallel to the axial direction.

Operation of the tool 190 involves alternative firings of the transmitters 20, 22. Each of the receivers 24A-D and 26A-D create received waveforms designated R, starting at the firing of a particular transmitter. Each of the received waveforms or signals has the following notation: $R_{[receiver][source]}$. Thus, for the firing of transmitter 20 in the X direction, and receipt by one of the receivers having an axis coplanar to the axis of transmitter 20 (receivers 24A-D), the time series received signal is designated as $R_{XX}$. Likewise, the cross-component signal, the signal received by the dipole receiver whose axis is substantially perpendicular to the axis of the firing transmitter, is designated $R_{YX}$ in this situation. In similar fashion, firing of the transmitter whose axis is oriented in the Y direction, transmitter 22, results in a plurality of received signals designated as $R_{YY}$ for the axially parallel receivers, and $R_{XY}$ for the cross-components. Thus, each transmitter firing creates two received signals, one for each receiver of the dipole receiver pair. It follows that for a set of dipole transmitter firings, four signals are received at each receiver pair indicative of the acoustic signals propagated through the formation. The acoustic signals may be processed using transform techniques known in the art to indicate formation anisotropy.

In one example, a processing method comprises calculating, or estimating, source signals or source wavelets that created each set of received signals by assuming a transfer function of the formation. Estimating source wavelets can be described mathematically as follows:

$$S_{EST_i}(t) = [TF]^{-1} R_i(t) \tag{1}$$

where $S_{EST_i}$ is the estimated source signal calculated for the ith set of receivers, [TF] is the assumed transfer function of the formation in the source to receiver propagation, and $R_i$ is the decomposed waveforms (described below) for the ith receiver set. Thus, for each set of received signals $R_i$, an estimate of the source signal $S_{EST_i}$ is created. The estimated source signals are compared using an objective function. Minimas of a graph of the objective function are indicative of the angle of the anisotropy, and the slowness of the acoustic waves through the formation. Further, depending on the type objective function used, one or both of the value of the objective function at the minimas, and the curvature of the of the objective function plot near the minimas, are indicative of the error of the slowness determination.

Thus, a primary component of the source signal estimation is the assumed transfer function [TF]. The transfer function may be relatively simple, taking into account only the finite speed at which the acoustic signals propagate and the strike angle, or may be very complex, to include estimations of attenuation of the transmitted signal in the formation, paths of travel of the acoustic signals, the many different propagation modes within the formation (e.g. compressional waves, shear waves, Stonely waves), and if desired even the effects of the acoustic waves crossing boundaries between different layers of earth formations. For reasons of simplicity of the calculation, the preferred estimated transfer functions take into account only the propagation speed (slowness) of the acoustic energy in the formation and the strike angle of the anisotropy.

Each of the received signals in the case described above contains components of both the fast and slow shear waves, and hence can be considered to be composite signals. That is, for example, an $R_{XX}$ receiver signal contains information regarding both the fast and slow polarized signals. These composite signals may be decomposed into their fast and slow components using equations as follows:

$$FP(t)=\cos^2(\theta)R_{XX}(t)+\sin(\theta)\cos(\theta)[R_{XY}(t)+R_{YX}(t)]+\sin^2(\theta)R_{YY}(t) \quad (2)$$

$$SP(t)=\sin^2(\theta)R_{XX}(t)-\cos(\theta)\sin(\theta)[R_{XY}(t)+R_{YX}(t)]+\cos^2(\theta)R_{YY}(t) \quad (3)$$

$$\sin(2\theta)[R_{XX}(t)-R_{YY}(t)]-\cos(2\theta)[R_{XY}(t)+R_{YX}(t)]=0 \quad (4)$$

where FP(t) is the fast polarization time series, SP(t) is the slow polarization time series, and $\theta$ is the strike angle as defined above. The prior art technique for decomposing the multiple received composite signals involved determining the strike angle $\theta$ by solving equation (4) above, and using that strike angle in equations (2) and (3) to decompose the composite signals into the fast and slow time series.

In another example for decomposing the composite signals into the fast and slow time series, a close inspection of equations (2) and (3) above for the fast and slow polarization time series respectively shows two very symmetric equations. Taking into account the trigonometric relationships:

$$\sin\theta=\cos(90°-\theta) \quad (5)$$

$$\cos\theta=\sin(90°-\theta) \quad (6)$$

it may be recognized that either the fast polarization equation (2) or the slow polarization equation (3) may be used to obtain either the fast or slow polarization signals by appropriately adjusting the angle $\theta$ used in the calculation. Stated otherwise, either the fast or slow polarization equations (2) or (3) may be used to decompose a received signal having both fast and slow components into individual components if the strike angle $\theta$ is appropriately adjusted.

Rather than using a single strike angle in both equations (2) and (3) above, each assumed transfer function comprises a strike angle. A plurality of transfer functions are assumed over the course of the slowness determination, and thus a plurality of strike angles are used, preferably spanning possible strike angles from −90° to +90° (180°). For each assumed transfer function (and thus strike angle), the four received signals generated by a set of receivers at each elevation are decomposed using the following equation:

$$DS(t)=\cos^2(\theta)\cdot R_{XX}(t)+\sin(\theta)\cdot\cos(\theta)\cdot(R_{XY}(t)+R_{YX}(t))+\sin^2(\theta)\cdot R_{YY}(t) \quad (7)$$

where DS(t) is simply the decomposed signal for the particular strike angle used. This process is preferably repeated for each set of received signals at each level for each assumed transfer function. Equation (7) is equation (2) above; however, equation (3) may be equivalently used if the assumed strike angle is appropriately adjusted.

Figure 3:
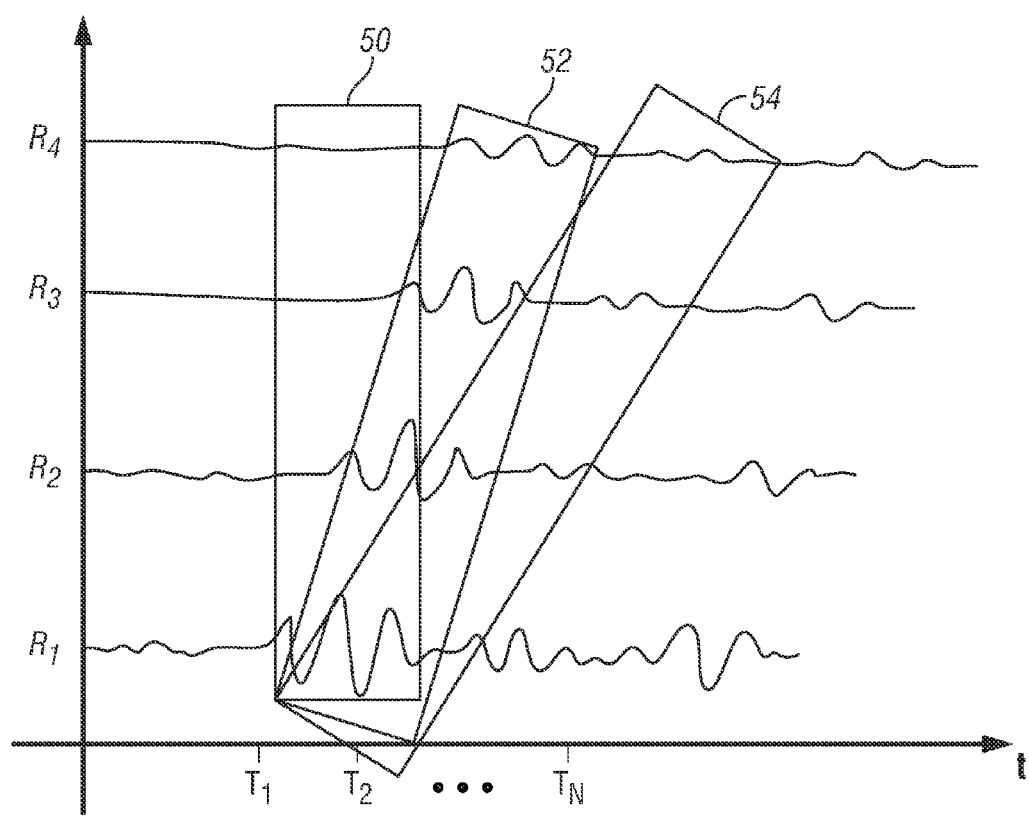
FIG. 3 shows an example set of decomposed received signals.

Consider a set of four decomposed signals, see FIG. 3, that are created using equation (7) above for a particular transfer function (strike angle). In the exemplary set of decomposed signals, R1 could be the decomposed signal created using the strike angle from the assumed transfer function and the composite signals received by the set of receivers 24A, 26A. Likewise, decomposed signal R2 could be the decomposed signal created again using the strike angle from the assumed transfer function and the composite signals created by the set of receivers 24B, 26B. In this example, the amplitude of the decomposed signal of the set of receivers closest to the transmitters, decomposed signal R1, is greater than the decomposed signals of the more distant receivers, for example R4. The waveforms may shift out in time from the closest to the more distant receivers, which is indicative of the finite speed of the acoustic waves within the formation.

For a particular starting time within the decomposed signals, for example starting time $T_1$, and for a first assumed transfer function having an assumed strike angle and slowness, portions of each decomposed signal are identified as being related based on the transfer function. Rectangular time slice 50 of FIG. 3 is representative of a slowness in an assumed transfer function (with the assumed strike angle used to create the decomposed signals exemplified in FIG. 3). In particular, the slope of the rectangular time slice is indicative of the slowness of the assumed transfer function. Stated another way, the portions of the decomposed signals within the rectangular time slice 50 should correspond based on the assumed slowness of the formation of the transfer function. The time width of the samples taken from each of the received signals may be at least as long as each of the source signals in a firing set. In this way, an entire source waveform or source wavelet may be estimated. However, the time width of the samples taken from the decomposed signals need not necessarily be this width, as shorter and longer times would be operational.

Thus, the portions of the decomposed signals in the rectangular time slice 50 are each used to create an estimated source signal. These estimated source signals are compared to create an objective function that is indicative of their similarity. In one example, the estimated source signals may be compared using cross correlation techniques known in the art. In another example, cross correlation of the frequency spectra of the received signals may be compared using techniques known in the art. The process of assuming a transfer function, estimating source wavelets based on decomposed signals and creating an objective function may be repeated a plurality of times. The rectangular time slices 50 through 54 are exemplary of multiple assumed transfer functions used in association with starting time $T_1$ (and the a strike angle used to create the decomposed signals). Estimating source wavelets in this fashion (including multiple assumed transfer functions) may also be repeated at multiple starting times within the decomposed signals.

The value of the objective function may be calculated for each assumed transfer function and starting time. Calculating the objective function of the first example technique comprises comparing estimated source signals to determine a variance between them. This slowness determination comprises calculating an average of the estimated source signals within each time slice, and then calculating a variance against the average source signal. In more mathematical terms, for each assumed transfer function, a series of estimated source waveforms or signals $S_{EST_i}$ are calculated using equation (1) above.

From these estimated source signals, an average estimated source signal may be calculated as follows:

$$S_{EST_{AVG}}(t) = \frac{1}{N} \sum_{i=1}^{N} S_{EST_i}(t) \quad (8)$$

where $S_{EST_{AVG}}$ is the average estimated source signal, N is the number of decomposed received signals, $S_{EST_i}$ is the source wavelet estimated for each decomposed received signal within the time slice, and t is time within the various time series.

The average estimated source signal is used to calculate a value representing the variance of the estimated source signals from the average estimated source signal. The variance may be calculated as follows:

$$\delta^2 = \sum_{i=1}^{N} (S_{EST_i}(t) - S_{EST_{AVG}}(t))^2 \quad (9)$$

where $\delta^2$ is the variance. In one embodiment, the variance value is determined as a function of slowness, starting time, and strike angle. Large values of the variance indicate that the assumed transfer function (assumed strike angle and/or assumed slowness) did not significantly match the actual formation properties. Likewise, small values of the variance indicate that the assumed transfer function closely matched the actual formation properties. Thus, the minimas of the objective function described above indicate the slowness of the fast and slow polarized waves as well as the actual strike angle. The value of the variance objective function at the minimas is indicative of the error of the determination of the acoustic velocity and strike angle. The curvature of the variance objective function at the minima is indicative of the error of the calculation.

A second embodiment for calculating an objective function is based on determining a difference between each estimated source signal. As discussed above, using the assumed transfer function, an estimated source signal is created using the portions of the decomposed signal within a time slice. Differences or differentials are calculated between each estimated source signal, for example between the source signal estimated from a portion of the R1 signal and the source signal estimated from the portion of the R2 signal. This difference is calculated between each succeeding receiver, and the objective function in this embodiment is the sum of the square of each difference calculation. The differential objective function is generated as a function of slowness, starting time, and strike angle. However, the function obtained using the differential slowness calculation has slower transitions from maximas to minimas which therefore makes determining the minimas (indicative of the actual slowness of the fast and slow polarizations) easier than in cases where the function has relatively steep slopes between minima and maxima More mathematically, the objective function of this second embodiment is calculated as follows:

$$\zeta = \sum_{i=1}^{N-1} (S_{EST_{i+1}} - S_{EST_i})^2 \quad (10)$$

where $\zeta$ is the objective function, and N is the number of receivers. Much like using the variance as the objective function, this differential objective function is a function of slowness versus starting time versus strike angle. Known techniques may be used to determine minima of these functions, and the locations of the minima are indicative of formation slowness and the strike angle.

Either of the two calculational techniques may be used. Numerous variations and modifications will become apparent to those skilled in the art once the above disclosure is fully appreciated. For example, the disclosed method for determining shear wave velocity and orientation may be implemented using any number of receiver levels and different receiver types for the acoustic logging tool. Indeed, even a single set of dipole receivers may be used relying on rotation of the tool to obtain additional composite signals for decomposition. Further, the source may be located at any arbitrary angle relative to the receivers. Moreover, processing of the data after collection at receivers can be performed downhole in real time with only the results being transferred uphole to a computer system for storage. Throughout this discussion, the various earth formation characteristics were discussed with reference to finding minimas of the objective function. However, one of ordinary skill in the art could easily invert the values used, thus making a determination a search for maximum values in the plot, and this would not deviate from the scope and spirit of the invention. While assuming the transfer functions in the embodiments described involved thus far assume a strike angle, it is possible that the transfer function need not include a strike angle estimation, and instead the composite signals could be decomposed for the range of possible strike angles independent of an assumed transfer function. It is also possible to solve for the strike angle using equation (4) above and decompose the composite waveforms using that strike angle; and thereafter, estimate and apply transfer functions to the decomposed signals, thus also removing the strike angle from the transfer function.

As discussed above, crossed-dipole acoustic tools use a pair of orthogonal acoustic sources to create acoustic surface waves on the borehole wall. These surface waves (flexural waves) are strongly influenced by the mechanical stresses in the formations surrounding the borehole as well as any intrinsic anisotropy (such as fine layering in shales). The tools measure the anisotropy in the X-Y plane that is orthogonal to the tool longitudinal axis. The tool is substantially insensitive to anisotropy in the Z axis aligned with the tool longitudinal axis. In several drilling situations, complex stress regimes in the formations of interest make it desirable to know the three-dimensional stress field surrounding the borehole.

As indicated, the acoustic tool described herein, provides information related to the anisotropy in the plane perpendicular to the local Z axis of the tool. At the L0 location in FIG. 1A, the XY plane of the tool is aligned with the XY plane of the earth system G. As the tool progresses, during drilling, along the path of borehole 126 in FIG. 1A, the local coordinate system rotates from vertical to horizontal, as indicated by the local coordinate systems $L_0$, $L_1$, and $L_2$. When acoustic tool 190 is in the horizontal section of the borehole, the Z axis of the earth coordinate system falls in the tools XY measurement plane. Thus by measuring in both the substantially vertical and substantially horizontal sections of the wellbore 126, the horizontal (earth) field measurements from location $L_0$ and the vertical (earth) field measurements from $L_2$ may be combined using suitable techniques known in the art to provide a three dimensional stress field.

Figure 1B:
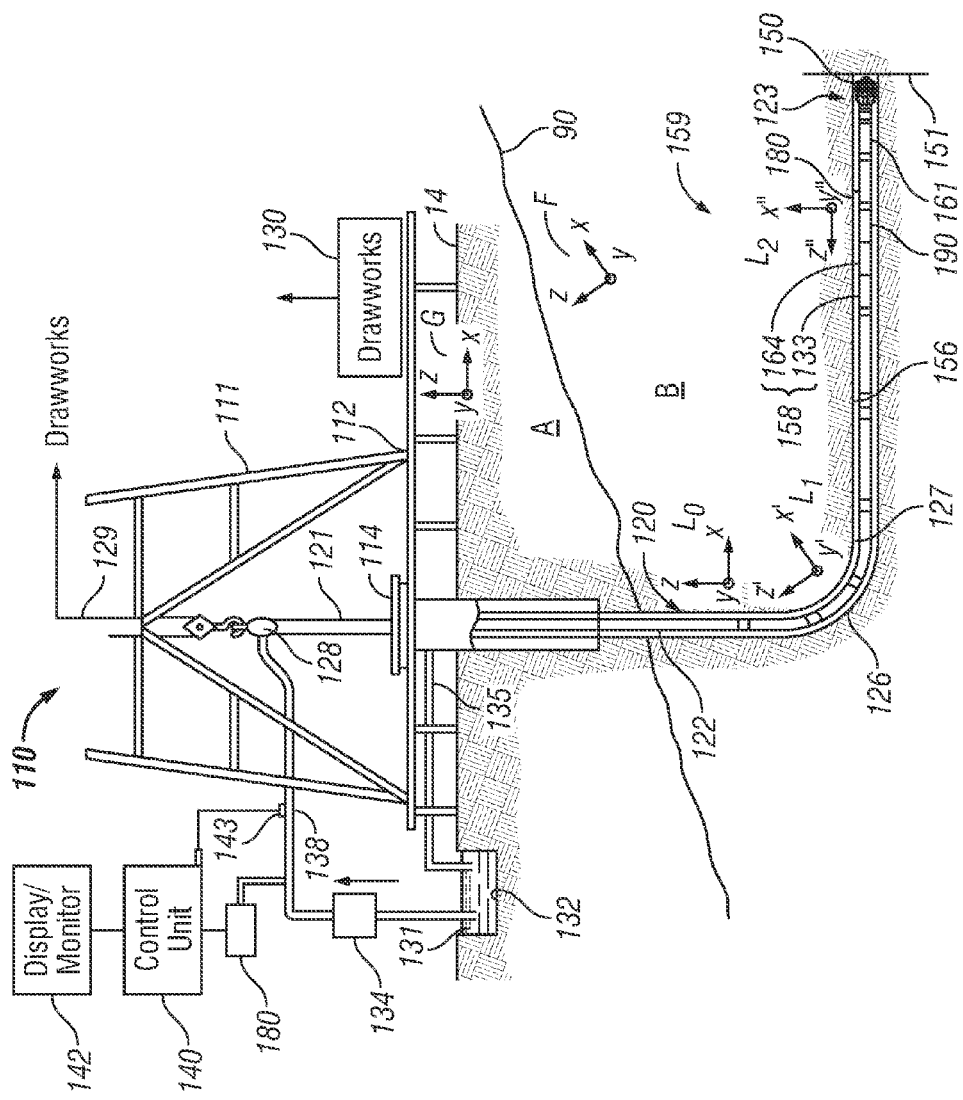
FIG. 1B shows an example of a drilling system traversing a dipping downhole formation.

FIG. 1B shows a system similar to that described above traversing through a formation that is dipping, or tilted, with respect to the earth's coordinate system G. The properties of the dipping formation are aligned to the coordinate system F, where the XY plane is substantially parallel the bed interface 90. Acoustic measurements made at location $L_0$ will measure components of the formation Z axis anisotropy. However, depending on the dipping angle, the sensitivity to the formation Z axis anisotropy may be weak. By again measuring in both the vertical (earth) and horizontal (earth) planes, the combined measurements may be related to the three dimensional stress field of the formation. In one example, the wellbore 126 may be drilled along a trajectory based on the three dimensional stress field. For example, the wellbore may be drilled to intersect fractures. In another example, the wellbore may be drilled along a path of minimum stresses. In one example, the calculations may be made downhole and may be used with drilling models stored in the downhole processor to adjust steering assembly 160 to drill the wellbore along a predetermined path based on the calculated anisotropic characteristics.

Figure 4:
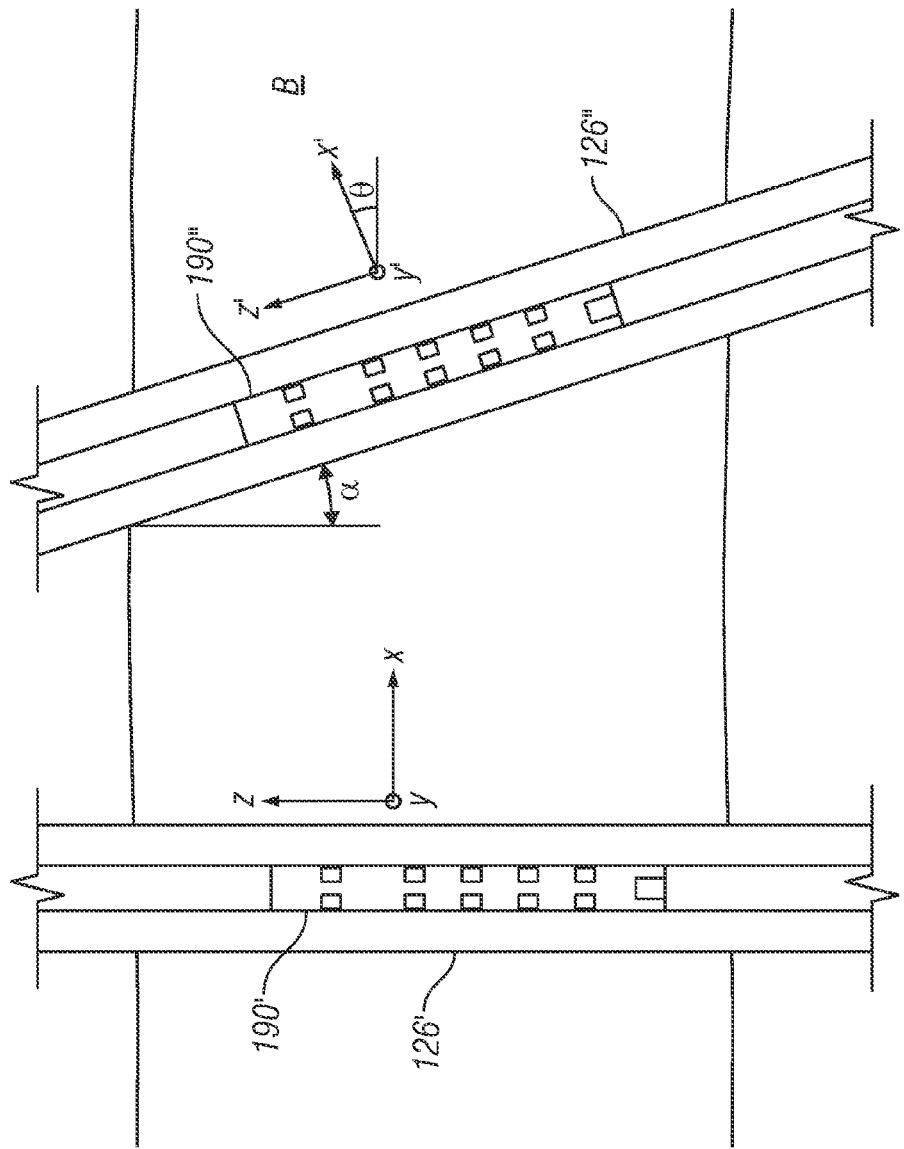
FIG. 4 shows an example of logging in two wells, inclined to each other, in the same formation.

In one example, see FIG. 4, the formation B is not large enough in the axial direction to allow the wellbore 126' to be turned to the horizontal direction. Alternatively, the well plan may not call for an inclined or horizontal section in the particular well. It may be possible to acquire suitable acoustic anisotropy measurements in an offset wellbore 126" that penetrates formation B at an inclination $\alpha c$ from vertical. Offset wellbore 126" may have been drilled and logged prior to the drilling of wellbore 126'. In one example, the measurements from tool 190" in well 126" may be stored and later downloaded in memory of tool 190' before deployment of tool 190'. The stored measurements may be combined with measurements made by tool 190' and the resulting anisotropy results transmitted to the surface using known MWD telemetry techniques. Alternatively, tool 190" may take measurements at approximately the same time as tool 190'. Measurements from both tool 190' and 190" may alternatively be processed in a surface control unit 140, or at a remote site using techniques known in the art.

In another example, see FIG. 5, instead of taking measurements at different axially displaced, orthogonal locations to acquire 3-D anisotropy results, a 3-axis acoustic tool 400 excites shear waves in all 3 axes by including an axial shear wave generator 401. In one example, acoustic tool 400 comprises the 2-D tool 190 described previously and axial shear wave generator 401. Axial shear wave generator 401 comprises a clamping device 405 that is extendable from the axial shear wave generator body 402 to engage the borehole wall around at least a portion of the circumference of the borehole wall. Clamp 405 is forced into cyclical axial motion by a force element in generator body 402. The cyclical axial motion generates shear on the borehole wall in the axial motion direction. The resulting shear waves propagate away from the borehole wall. The shear waves produced by the clamped axial generator propagate substantially orthogonal to the shear waves generated by the dipole sources 20, 22 described above.

In an isotropic medium, the clamped axial shear wave generator 401 will produce shear waves that move out into the formation and compressional waves along the borehole axis. If there is anisotropy, the wave from the clamped dipole source may split producing wave components along the three principle axes depending on the orientation of those axes relative to the borehole. The signals propagate out into the formation and are reflected back to the receivers 24 and 26 described previously. In one example, the signals may be processed in a downhole processor, using techniques known in the art, to determine the 3-D anisotropy characteristics of the formation, and the results transmitted to the surface using known telemetry techniques. Alternatively, the raw data may be transmitted to the surface and processed at the surface. The anisotropic characteristics comprise at least one of a three dimensional stress field and a three dimensional velocity field of the formation.

FIGS. 6A and 6B show one example of an axial shear wave generator 401 comprising a housing 402 that may be in drillstring 122 (see FIGS. 1A and 1B). As used herein, the term axial is intended to mean along, or parallel to, the longitudinal axis of the wellbore. An extendable member 409 is controllably extendable outward from housing 402 toward the wall 430 of wellbore 426. In one example, a clamp pad 407 is attached to extendable member 409, and engages wall 430. As shown in FIG. 5B, each pads 407 A-D may approximate a circumferential ring attached to wall 430 when all of pads 407 A-D are extended to engage wall 430. In one embodiment, extendable member 409 may be part of a telescoping cylinder located on a movable base 410 disposed in housing 402. In one example, movable base is 410 is attached to an axial force assembly 412 that provides axial back and forth motion to movable base 410, thus providing axial motion to clamp pads 407. In one embodiment, axial force assembly 412 comprises a stack of piezoelectric disks 413 polarized to extend and contract axially when excited by a suitable electric signal. In one embodiment, a backing mass 450 is mounted between the piezoelectric disks 413 and a shoulder 403 in housing 402. In one example, backing mass 450 may comprise a tungsten material and/or a tungsten carbide material. Backing mass 451 helps to ensure that the majority of axial movement of the piezoelectric stack is directed toward the clamp bands. In one example, controller 415 comprises suitable electric circuits and processors to power the crystals and control the extension, and/or retraction, of extendable members 409. Power source 420 may comprise suitable batteries for powering the axial shear wave generator during operation. Controller 415 may be in suitable data communication with other controllers in the downhole tool. Programmed instructions in controller 415 may be used control shear wave generation, data acquisition, and calculation of the anisotropic properties of the formation. In an alternative embodiment, magnetostrictive materials may be used to power the back and forth movement of clamp members 407 to generate axial shear waves in the surrounding formation. Such magnetostrictive materials may include nickel and rare earth materials for example a terbium-dysprosium-iron material. Such materials are known in the art.

While described above with relation to an MWD/LWD system, one of ordinary skill in the art will appreciate that the apparatus and methods described herein may be used with wireline, slickline, wired drill pipe, and coiled tubing to convey the acoustic tools into the wellbore.

What is claimed is:

1. A method for determining at least one characteristic of an anisotropic earth formation, comprising:

transmitting dipole acoustic energy into the earth formation at a first location in a wellbore where the acoustic energy propagates as a fast polarized shear wave and a slow polarized shear wave in a plane of the formation orthogonal to a first longitudinal axis of the wellbore at the first location;

receiving at the first location composite waveforms comprising components of both a fast polarized shear wave and a slow polarized shear wave from the plane of the formation orthogonal to a first longitudinal axis of the wellbore at the first location;

transmitting dipole acoustic energy into the earth formation at a second location in a wellbore where the second location is axially displaced from the first location and a second longitudinal axis of the wellbore at the second location is substantially orthogonal to the first longitudinal axis of the wellbore at the first location and where the acoustic energy propagates as a fast polarized shear wave and a slow polarized shear wave in a plane of the formation orthogonal to the second longitudinal axis of the wellbore at the second location;

receiving at the second location composite waveforms comprising components of both a fast polarized shear wave and a slow polarized shear wave from a plane of the formation orthogonal to the second longitudinal axis of the wellbore at the second location; and combining the received signals at the first location and the second location to determine the least one characteristic of the anisotropic formation.

2. The method of claim 1 further comprising transmitting the at least one determined characteristic of the anisotropic earth formation to a surface location.

3. The method of claim 1 wherein the at least one characteristic of the anisotropic earth formation comprises at least one of: a three dimensional stress field of the formation and a three dimensional velocity field of the formation.

4. The method of claim 1 wherein transmitting acoustic dipole energy into the earth formation further comprises firing a first dipole transmitter in a first direction, then firing a second dipole transmitter in a second direction substantially azimuthally perpendicular to the first direction.

5. The method of claim 1 further comprising adjusting the direction of the wellbore based at least in part on the determined characteristic of the anisotropic formation.

6. A method for determining at least one characteristic of an anisotropic earth formation, comprising:

transmitting dipole acoustic energy into the earth formation at a first location in a first wellbore where the acoustic energy propagates as a fast polarized shear wave and a slow polarized shear wave in a plane of the formation orthogonal to a first longitudinal axis of the wellbore at the first location;

receiving at the first location in the first wellbore composite waveforms comprising components of both a fast polarized shear wave and a slow polarized shear wave from the plane of the formation orthogonal to a first longitudinal axis of the first wellbore at the first location;

transmitting dipole acoustic energy into the earth formation at a second location in an offset wellbore where a second longitudinal axis of the offset wellbore at the second location is inclined to the first longitudinal axis of the first wellbore at the first location and where the acoustic energy propagates as a fast polarized shear wave and a slow polarized shear wave in a plane of the formation orthogonal to the second longitudinal axis of the offset wellbore at the second location;

receiving at the second location composite waveforms comprising components of both a fast polarized shear wave and a slow polarized shear wave from a plane of the formation orthogonal to a second longitudinal axis of the offset wellbore at the second location; and combining the received signals at the first location and the second location to determine the least one characteristic of the formation.

7. The method of claim 6 further comprising transmitting the at least one determined characteristic of the anisotropic earth formation to a surface location.

8. The method of claim 6 wherein the at least one characteristic of the anisotropic earth formation comprises at least one of: a three dimensional stress field of the formation and a three dimensional velocity field of the formation.

9. The method of claim 6 wherein measurements in the first wellbore and measurements in the offset wellbore occur at different times.

* * * * *